UNITED STATES PATENT OFFICE.

WILLIAM EDWARD HARRIS, OF NEW YORK, N. Y.

PROCESS OF EXTRACTING GOLD, SILVER, AND LEAD FROM ORES.

SPECIFICATION forming part of Letters Patent No. 312,847, dated February 24, 1885.

Application filed February 5, 1884. (No specimens.)

*To all whom it may concern:*

Be it known that I, WILLIAM EDWARD HARRIS, of New York, in the county of New York and State of New York, have invented a new and Improved Process for Extracting Gold, Silver, and Lead from Ores, of which the following is a full, clear, and exact description.

The object of this invention is to facilitate the removal of gold, silver, and lead from ores.

The invention consists in mixing finely-pulverized ore with the oxides of iron or copper and then smelting the mixture on a bath of lead.

In carrying my invention into practical effect, I take iron or cupreous iron pyrites and oxidize them in any suitable furnace, and then mix them or any other iron or copper oxides with raw ore in the proportion of from twenty-five to fifty per cent. of oxides to from fifty to seventy-five per cent. of raw ore. I then scatter this mixture over a bath of lead and smelt it with a heat of about fifteen hundred degrees (1,500°) Fahrenheit, and keep raking it over the bath. During this operation the following reactions take place: The oxygen in the iron and copper oxides attack the lead in the bath, forming oxide of lead. The iron and copper, now free of their oxygen, receive the sulphur from the silver, lead, or any other mineral that may be in combination with sulphur. The silver and gold, now freed from sulphur, enter into combination with the lead in the bath, forming base bullion, which can be parted by any of the known processes for separating gold and silver from lead. The lead in the ore, being freed of its sulphur, part of it enters the bath and part is oxidized and remains in the slag, which consists of oxide, sulphide, silicate, and metallic iron in combination with oxide of lead and sulphide of copper as a matte, which slag, after being skimmed of the sulphide-of-copper matte, is finely pulverized, mixed with finely-pulverized charcoal, and smelted in a reverberatory furnace, which causes the slag to give up the lead.

I am aware that it is old to roast sulphurets in the presence of silicates, adding, in order to complete the roasting and expel all the sulphur contained in the mineral, either lead, which is intended to form oxide of lead, or litharge or minium, or any other metallic oxide capable of producing in contact with air or oxidizing-flames peroxides or silicates of peroxides; second, in thus transforming into the state of very fusible basic silicates the oxides of the desulphureted metals and permitting the complete dissolution in the lead of the gold and silver contained in the basic silicates; third, then these silicates produced are melted upon a matte of lead, and the gold and silver are entirely dissolved in the melted lead.

Now, in my application I roast the sulphurets to form oxides, (not silicates,) and bring this roasted matter in direct contact with a bath of lead, which forms out of this bath of lead an oxide of lead, leaving the gold and silver that were in the sulphurets absorbed by the bath.

I form oxide of lead out of the bath, not by mixing lead in combination with silica with the roasted sulphurets to form basic silicates, as in the process referred to, as in said process the gold and silver were extracted from the basic silicates by the bath, not from the roasted sulphurets direct, as in my application. In said process the amount of lead is but little diminished by the repeated liquations, while in my process each liquation removes a large amount of lead in the form of oxide. In said old process the slag contains mostly silicates of lead. In my process it contains mostly oxide of lead. The process referred to transforms into the state of very fusible basic silicates the oxides of the desulphureted metals. I transform into the state of very fusible oxide the oxides of the desulphureted metals. In said patented process it is desired to form silicates in the roasting, while I want to form oxides in my roasting.

I am aware that lead ores are smelted with ores of the precious metals and oxide of iron, producing a bath of lead, which takes up the precious metals, in which case base bullion is formed, containing lead to the amount of lead in the lead ore introduced in the operation, and as the lead ore contains sulphur more or less matte is formed during the operation, and such smelting can only be carried on in locations in which lead ores can be obtained.

In my application I smelt lead (not lead ores) that is oxidized during the operation by the oxide of iron or other base-metal oxides with the precious metals. As the lead contains no sulphur, no matte is formed, and in my process I oxidize the lead out of the base bullion formed, so that during the operation I am reducing the amount of lead in the bullion; but in the lead-ore-smelting operation the amount of lead remains the same as the amount of lead in the lead ore introduced during the operation. In some sections of country the amount of lead would be so great in the base bullion that it would not pay to ship it, on account of the low price of that metal, and in a number of sections of country smelters could not be run at all on account of not being able to get lead ore to carry on the operation; but in my application I can work in any section of country that may have gold and silver in paying quantities in it, for I only use lead, and that lead is used over and over a great number of times.

My operations are, first, to make an oxidizing roast out of base-metal sulphurets as free of silica as possible; second, to oxidize melted lead out of a bath by smelting upon it the oxidized base metals, which allows the precious metals to enter the lead that remains in the bath; third, to remove and smelt the slag that forms upon the bath of lead to a blast-furnace, and smelt in the same manner as lead-smelting is carried on, to get back the lead that the slag contained, and at the same time ores containing precious metals can be mixed with this slag in proportions of about fifteen per cent. to the ton of the amount of lead that the slag may contain to each ton of ore added. By the process first referred to this mixing of slag with ores containing precious metals would cause a great loss in gold, silver, and lead, that would be carried off in the slag, on account of the slag being formed mostly of silica, and no flux could be added that is cheap enough to make it a paying operation that would allow a complete separation of the gold, silver, and lead from the slag; but in my process the oxide of iron that is in combination with the oxide of lead is flux enough to enter into combination with any silica that may be in the ore, and by so doing forms the best known combination for a complete separation of the gold, silver, and lead from the slag; fourth, to return the lead thus obtained back to the lead bath, to go through the operation as in the second operation, and so on repeat the operations.

Having thus described my invention, I claim as new and desire to secure by Letters Patent—

The process of extracting gold, silver, and lead from ores, which consists in mixing finely-pulverized oxides of iron or copper with gold, silver, or lead ores, and then smelting the mixture on a bath of lead, substantially as described.

WILLIAM EDWARD HARRIS.

Witnesses:
T. A. HOUGHTON,
SAMUEL HEAN.